United States Patent [19]
Chen et al.

[11] Patent Number: 6,141,493
[45] Date of Patent: Oct. 31, 2000

[54] FILING OF VARIABLE-BIT-RATE VIDEO INFORMATION ON ZONED DISKS

[76] Inventors: Meng-Chang Chen; Jan-Ming Ho; Ming-Tat Ko; Ray-I Chang; Wang Yu-Chung; Shiao-Li Tsao, all of Institute of Information Science Academia Sinica, Nankang, Taipei, Taiwan

[21] Appl. No.: 08/964,321

[22] Filed: Nov. 4, 1997

[51] Int. Cl.[7] .................................................. H04N 5/781
[52] U.S. Cl. ................................ 386/125; 369/60; 348/7; 360/48
[58] Field of Search .................................... 386/125–126, 386/111–112, 46, 83, 45; 348/6–7, 12–13; 369/44.26, 60; 360/48, 50; 709/217, 219; H04N 5/781

[56] References Cited

U.S. PATENT DOCUMENTS

| 5,719,983 | 2/1998 | Henderson et al. | 386/125 |
| 5,721,823 | 2/1998 | Chen et al. | 348/7 |
| 5,742,443 | 4/1998 | Tsao et al. | 360/50 |
| 5,926,649 | 7/1999 | Ma et al. | 711/111 |
| 5,983,319 | 11/1999 | Ito | 711/113 |
| 6,018,790 | 1/2000 | Itoh et al. | 711/114 |
| 6,055,354 | 4/2000 | Bopardikar | 386/46 |

Primary Examiner—Wendy Garber
Assistant Examiner—Vincent F. Boccio
Attorney, Agent, or Firm—Bacon & Thomas, PLLC

[57] ABSTRACT

Architecture for filing variable-bit-rate (VBR) video data on zoned disks based on the character of the VBR data and the character of the zoned disk. A "constant read-time" approach is disclosed to determine the filing layout of data. In this invention, the distribution of the data is determined by the sequence of retrieving the data. A multistage graph is used to describe the structure of the filing architecture of this invention. The invention also provides a segmentation algorithm to reduce time and space complexities in the processing of VBR data.

9 Claims, 3 Drawing Sheets

FILING OF VARIABLE-BIT-RATE VIDEO INFORMATION ON ZONED DISKS

FIELD OF THE INVENTION

The present invention relates to an architecture of filing variable-bit-rate (VBR) video data on zoned disks, especially to an architecture and method of filing VBR data on zoned disks based on the character of the VBR data and the character of the zoned disk. In the present invention, a "constant read-time" approach is disclosed to determine the filing layout of data.

BACKGROUND OF THE INVENTION

As the advances of the networking technologies, the compression techniques and the storage devices, computer media are widely utilized in many applications, such as entertainment and education. When the video media is the case, the video contents are usually stored as a sequence of frames where each frame represents a single image snapshot. During the play-back, the timing of play-back of the video is critical in maintaining the quality of the video. Especially in the case of remote play-back, each frame has to be delivered to and played-back by the user work station within a time limit in order not to produce observable jitters.

Another reason for the timing constraint is to synchronize the video media with other media, such as voice and text, in a multimedia application. In order to sustain the system with high quality-of-service (QoS), the storage system has to guarantee its performance as it plays a major role in supporting a real-time video media.

Besides the real-time criteria, designing a video storage system needs to deal with the storing and the retrieving of large amount of video data. Compression techniques are popular in reducing the size of the video files. For instance, the MPEG 1 data compression standard can reduce the file size up to one fortieth of the original. Due to the nature of the compression algorithms, the compressed video frames have variable sizes where the term VBR video comes from.

In order to improve the throughput of the disks, the conventional design of the storage systems are focused on the scheduling and the data placement of the disks so that the seeking time of the data may be reduced. Of late, zoning technique has been developed to increase the capacities disks. Under the zoning design, a zone in a disk comprises a group of contiguous track with the equivalent number of sectors per track. There are typically 3 to 20 zones on a hard disk, and the number is likely to be doubled by the end of this decade. FIG. 1 shows the distribution of zones and tracks of a zoned disk with 3 zones. In order to fully use the disks' magnetized surface, there are more sectors in the outer zones than in the inner zones. In other words, the outer zones have larger track size then has the inner zones. Another effect of disk zoning is that the disk has higher data transfer rates (or bandwidths) in the outer zones than in the inner zones, as disks spin at a constant angular velocity. Such zoning technology helps to increase the throughput of disks of video servers. Generally speaking, storing larger and more frequently accessed blocks in the outer zones, and smaller and less frequently accessed blocks in the inner zones can obtain higher average throughput.

PRIOR ART

The effective bandwidth of a zone disk is not guaranteed due to the file layout and the access pattern of the blocks. To alleviate this problem, a concept of "logical track" is disclosed. A logical track means a group of tracks consisting of one track from each zone. Every logical track has a constant size and is treated as an access unit so that a uniformed bandwidth of the zone disks can be achieved. However, the overall disk throughput is low due to excessive seeking operations. Moreover, since the number of tracks differs from zone to zone, disk space in the zones with more tracks is wasted.

A track-pairing scheme was presented in the conventional art. In this scheme, two complementary tracks are grouped into a track pair and in filing the data, a pair of tracks is treated as a unit. This approach is a less restrictive alternative of the previous approach that takes a compromises between the uniformed bandwidth and the disk access time.

In the conventional art, also disclosed are an FIXB data placement method and a VARB data placement method. These methods work with a region-based data placement scheme which places data on zoned-disks for the continuous media services of constant bit-rate data.

In the FIXB method above, the block size is constant in every zone, while in the VARB method, the retrieval time of a block is constant in every zone. In both methods, data blocks in the outer zones are read in advance so to compensate the access of data in the inner zones. However, both FIXB and VARB methods are constrained by the parameters of the zones which parameters depend on the manufacture of the disks, and result in excessive waste of storage space, long initial delay, and large buffer requirements. These approaches may only apply to data with constant bit-rate but not to data with variable bit-rate (VBR).

For the storage of VBR data, Chang et al. presented the constant data-length (CDL) data placement and constant time length (CTL) data placement methods (Ed Chang and Avideh Zahkor: "Cost analyses for VBR video servers", Proceedings of SPIE Multimedia Computing and Networking, pp.381–397, 1996). The drawback of the CDL method is large buffer requirement, while CTL data placement causes the problem of disk fragmentation. Both methods suffer from complicated admission control due to the variable retrieval duration. They further proposed a hybrid method to compromise CDL and CTL. In this hybrid method, data are stored under the CTL data placement but retrieved a variable number of blocks in each service round.

Neufeld et al. presented a read ahead buffering algorithm to contribute to said hybrid method (Gerald Neufeld, Dwight Makaroff and Norman Hutchinson: "Design of a variable bit rate continuous media file server for an ATM network", Preceedings of SPIE Multimedia Computing and Networking, pp. 370–380, 1996). This approach accommodates more users by using a pre-fetched-buffering technique. A generalized CDL method was proposed for VBR video data by Biersack et al. (Ernst Biersack, Frederic Thiesse and Christoph Bernhardt: "Constant data length retrieval for video servers with variable bit-rate streams", Proceedings of International conf. On Multimedia Computing and Systems, pp. 151–155, 1996). In this method VBR video data are cut into segments to which the CDL method is applied. The method helps to reduce the buffer requirement. These improvements, however, did not solve the problems of both CDL and CTL methods.

PURPOSES OF THE INVENTION

The purpose of this invention is to provide a novel filing architecture for VBR data on zoned disks.

Another purpose of this invention is to provide a filing architecture for VBR data on zoned disks with which the buffer requirement in the real-time play-back of the data may be reduced or even minimized.

Another purpose of this invention is to provide a segmented algorithm to further reduce the time and the complexity in filing and retrieving VBR data on zoned disks.

SUMMARY OF THE INVENTION

According to this invention, VBR data are stored on zoned disks. An optimization of data placement for VBR data on zoned disks is presented to minimize the server buffer size and to maximize the utilization of the disks, under the constraint of the timing in playing-back the VBR data. In this invention, a "constant read-time" (CRT) approach is disclosed where a constant period of time is allocated to retrieve each data block. As in this invention, the distribution of the data is determined by the sequence of retrieving the data, a multistage graph is used to describe the structure of the filing system of this invention. The invention also provides a segmentation algorithm to reduce time and space complexities in the processing of the VBR data.

The above and other purposes and advantages of this invention can be clearly understood from the detailed description by referring to the following drawings.

IN THE DRAWINGS

Table 1 shows the block size and the block numbers in each zone and the number of the zero blocks, as the data file of movie "Starwar" is stored under the filing architecture of this invention.

Table 2 shows the buffer requirement and the utilization rates in other embodiments of this invention.

Table 3 shows the relation between the number of segmentation and the operation time, while a segmentation algorithm is used.

DETAILED DESCRIPTION OF THE INVENTION

The following is a detailed description of the filing architecture of variable bit-rate (VBR) data on zoned disks of this invention.

In the present invention, the VBR data are stored in zoned disks to be accessed (retrieved) by a number of clients. Under the architecture of this invention, the distribution of data (files) on the zoned disks is determined by the sequence of retrieving the data. In playing-back the data, a service round in which each of a collection of clients is served in sequence for one time, is considered a unit of service.

In order to satisfy the need of real-time service, the distribution of data on the disks, i.e., the scheduling of retrieving the data from the disks, shall comply with the timing constraint of the play-back. In this invention, a "constant read-time" (CRT) algorithm is presented to filing the VBR data on zoned disks such that the timing constraint and other constraints may be complied with. Under the CRT algorithm, a constant read-time is allocated to each data block and each admitted user is allocated with a fixed time interval for every service round. A user may decide to be active or idle in a service round. In each access, a user reads a data block from one of the zones in the disk.

Although it is not intended to limit the scope of this invention, it is found that, while a constant read-time is allocated to each data block, under the structure of the zoned disk, a retrieval path map may be used to determine the retrieval schedule of the data and the optimal distribution of data on zone disks may be obtained. Under such distribution of data, while the zoned disk is the case, the buffer requirement in the server may be minimized. While the access time for every user is fixed, the admission control is trivial where only the residual access time is checked.

Figure 1:
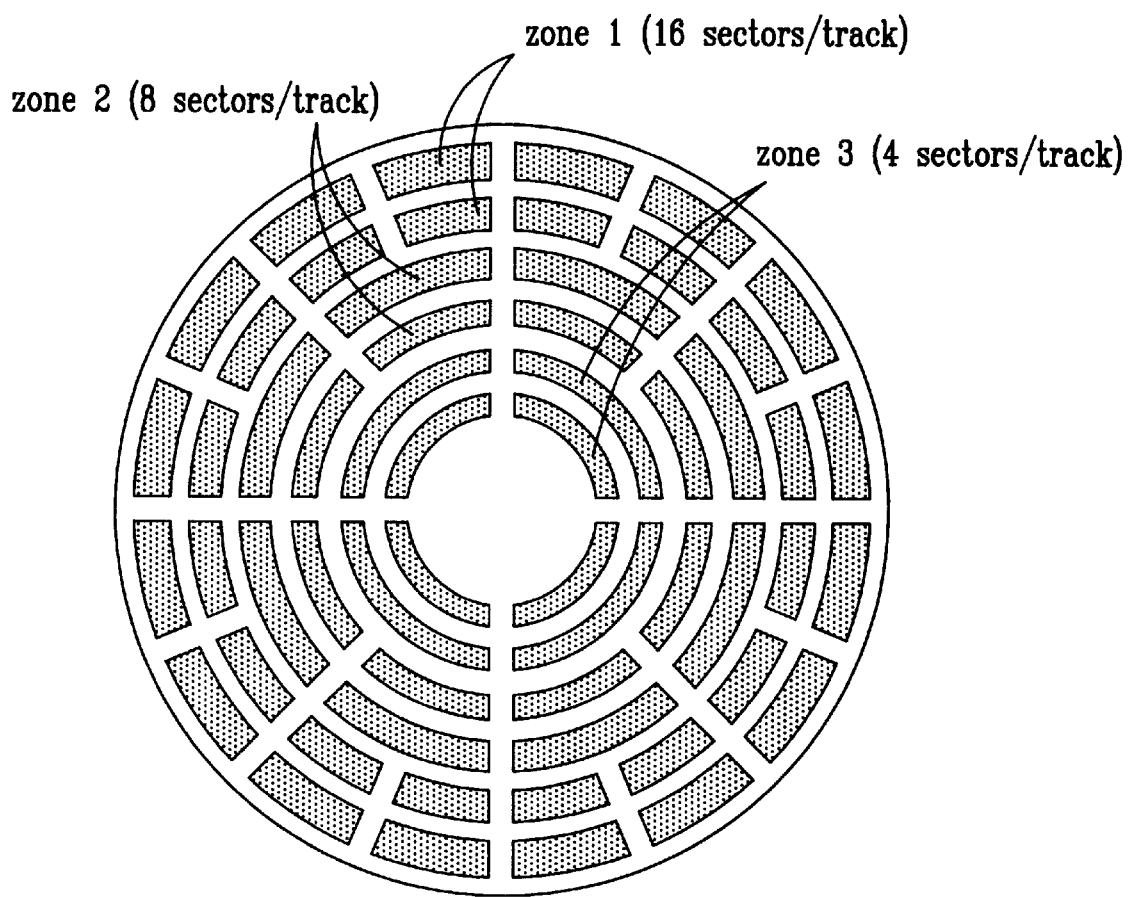
FIG. 1 illustrates the distribution of zones and tracks on a zoned disk with 3 zones.
Figure 2:
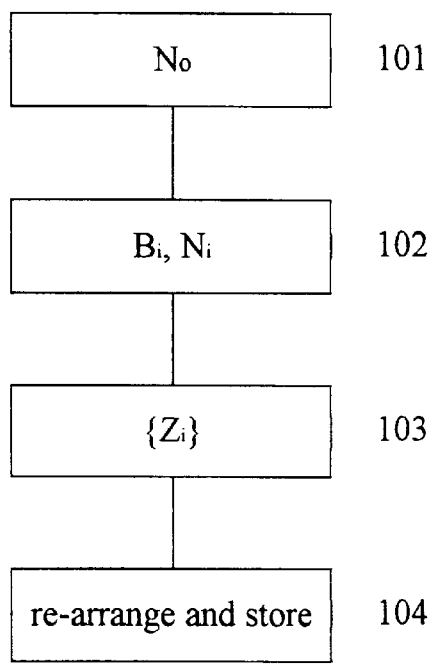
FIG. 2 illustrates the flow chart of determining the filing architecture of VBR data on zoned disks of this invention.

The following is a description of the method for determining the data distribution on zoned disks of this invention. FIG. 2 illustrates the flow chart of determining the filing architecture of VBR data on zoned disks of this invention. As shown in this figure, the steps to determine the filing structure of VBR data on zoned disks include:

At 101 the number of the zero blocks, i.e., the idle service rounds, ($N_0$) is first determined. This number can be decided according to the data transfer rate (or bandwidth) of the disk and will be described in details hereinafter.

At 102 the play-back time of a block (s) is determined and, based on this play-back time, the size of the blocks ($B_i$) and the number of blocks in each zone ($N_i$) are determined. In this invention, size of data allocated to each zone is not constant but is proportional to the storage capacity of a zone. This helps to balance the utilization of the space of the zones.

At 103 a multistage retrieval path map is used to determine the sequence of the play-back ($\{X_i\}$) such that the buffer requirement may be minimized.

At 104 the data are stored in the zoned disks according to the play-back sequence.

The above steps will be described in details in the followings.

Number of the Zero Blocks

In the first step, the number of the zero blocks ($N_0$) is determined. This block number can be determined according to the utilization rate of the disk.

Figure 3:
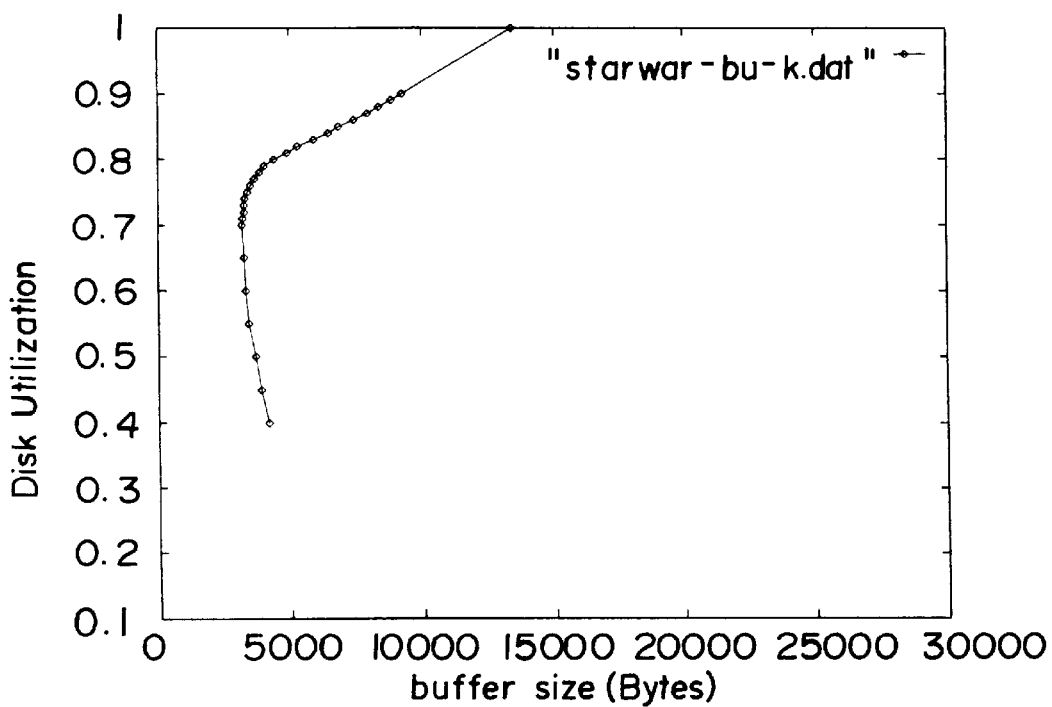
FIG. 3 shows the relation between the buffer requirement and the utilization rate of the disk in playing-back the video data of the famous movie: "Starwar".

It is found that the buffer requirement and the utilization of the disk in playing-back the data are relative. FIG. 3 shows the relation between the buffer requirement and the utilization rate of the disk in playing-back the video data of the famous movie: "Starwar". This figure is obtained by simulations. As shown in this figure, when the utilization rate of the disk is greater than a threshold, the buffer requirement increases with the decrease of number of the zero blocks. While the utilization rate is below the threshold, the buffer requirement starts to increase. This means, when introducing too many zero blocks, i.e., too many idle service rounds, the size of data blocks shall be increased to meet the utilization rate of the disk. Therefore, it results in large buffer size. The utilization can thus be determined according to the purpose of the application.

Once a utilization rate is selected, the number of the zero blocks ($N_0$) may be determined according to the following equation:

$$\text{Utiliztion} = 1 - \frac{N_0}{N} \quad (1)$$

where N is the number of service rounds.

Here, a general utilization rate may be designated for use in video data with similar characters.

Determination of Block Sizes and Block Numbers in the Zones

According to this invention, the quantity of data allocated to each zone is not fixed but is proportional to the size of the zone, as follows:

$$L_i = L \times \frac{C_i}{\sum C_j} \quad (2)$$

wherein L is the length of the data file (bytes), $L_i$ is the length of the data allocated to the $i^{th}$ zone and $C_i$ is the capacity of the $i^{th}$ zone. This proportional allocation helps to balance the space utilization among zones. The number of blocks of each zone may be decided as follows:

$$N_i = \frac{L_i}{B_i} \quad (3)$$

wherein $B_i$ is the block size of the $i^{th}$ zone, i.e., the $i^{th}$ service round.

From equation (3) we have:

$$N = \sum N_i = \sum \frac{L_i}{B_i} \quad (4)$$

From equation (2) we further have:

$$\sum N_i = \sum \frac{L * \frac{C_i}{\sum C_j}}{B_i} \quad (5)$$

In the present invention, the block size in each zone is fixed and the block size is proportional to the data transfer rate in the zone. We thus have:

$$\frac{B_i}{D_i} = \frac{B_2}{D_2} = \cdots \frac{B_z}{D_z} = S \quad (6)$$

wherein $B_i$ is the block size in the $i^{th}$ zone, $D_i$ is the data transfer rate in the $i^{th}$ zone, z is the number of zones in a disk and s is the play-back time. Equation (5) can thus be replaced by:

$$\sum N_i = \sum \frac{L * \frac{C_i}{\sum C_j}}{S * D_i} \quad (7)$$

And thus:

$$S = \frac{L * \sum \frac{C_i}{D_i}}{N * C} \quad (8)$$

Because the play-back time for each zone is fixed, the block size ($B_i$) can be determined by $s \times D_i$ and the block number ($N_i$) can be determined by $$N_i = \frac{L_i}{B_i}.$$

Distribution of Data

Suppose the intermediate points of a retrieval sequence are denoted as $(n_0, n_i, \ldots, n_k)$ wherein $n_i$ stands for the number of the blocks in the $i^{th}$ zone which have been played-back in the sequence. At the initial stage, all $n_i$'s are set to be 0. Once a block in the $i^{th}$ zone is retrieved, $n_i$ is incremented by 1.

For example, if a client retrieves one block from the first zone at service round 1 and one block from the second zone at service round 2, the intermediate points shall be (1,1,0). In this invention, the intermediate points will be used to describe the data distribution on the zoned disks.

From the previous discussion, it is found that the optimization of the data distribution on disks may be considered an optimization of data retrieval, under a combination of several factors, as follows: We have k zones. Each zone has $N_z$ blocks which are of the same size. Each time a client is served (a "service run") and in each service run one block is retrieved where the length of data needed by a client is $l_i$ in the $i^{th}$ service run. A retrieval sequence $\{Z_i\}$ may be found:

$$\{Z_i\}, 1 \leq i \leq N, 0 \leq Z_i \leq K \quad (9)$$

wherein K is the number of zones in the disk, N is the run number of a data file. When $Z_i=0$, no data is retrieved. When $Z_i=g$, the $g^{th}$ zone is retrieved a block in the $i^{th}$ service run. The sequence set $\{Z_i\}$ defines a possible retrieval schedule and the place of blocks in the disk as well.

Figure 4:
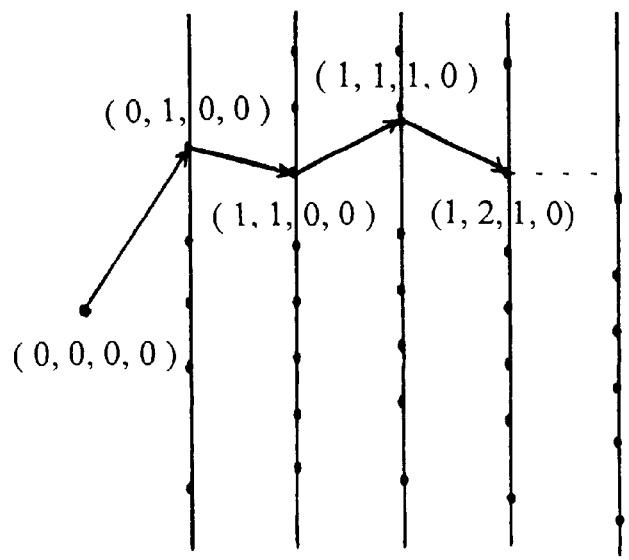
FIG. 4 illustrates an example of a multistage path map.

FIG. 4 illustrates a directed multistage retrieval path map. As shown in this figure, the path denotes a possible retrieval sequence of the data from a zoned disk. This model, however, may be used to describe the distribution of blocks in a zoned disk.

A simple example will be used to illustrate this mapping model. Given a sequence set $\{Z_i\}$, $\{Z_i\}=\{1, 0, 2, 1\}$, to denote that a block is retrieved from $1^{st}$ zone in the first service run, no data is retrieved in the second service run, one block is then retrieved from the $2^{nd}$ zone in the fourth service run and one block is retrieved from the $1^{st}$ zone in the final service run. The path (and the intermediate points) of this retrieval sequence is shown in FIG. 4.

As different paths may be given to each sequence set $\{Z_i\}$, the nodes (intermediate points) of the map may be labeled by vectors $(n_0, n_1, \ldots, n_z)$.

In order to find a path with the least buffer requirement, under the timing restraint $L_i$, the buffer requirement may be determined by selecting a retrieval sequence set or to select a retrieval path. The buffer requirement of each service run may be calculated by:

$$B_i = \sum_{j=1}^{i} b_{zj} - L_i \qquad (10)$$

With graphic variables, we have:

$$B_i = \sum_{k=1}^{z} n_k b_k - L_i \qquad (11)$$

wherein bk represents the size of the $k^{th}$ block during the retrieval sequence.

It is thus obvious that $B_i$ is constant during the retrieval. The buffer requirement under a retrieval sequence set or path is:

$$\max_{i=1}^{N} B_i \qquad (12)$$

Figure 5:
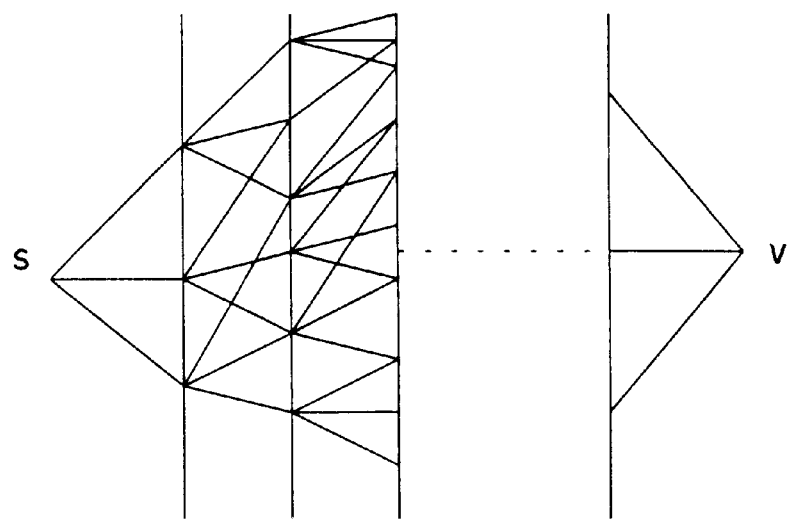
FIG. 5 illustrates a multistage path map in retrieving data from disks, as applicable in the embodiments of this invention.

As described above, the optimized data distribution on the disk may be described with a model of the retrieval path. FIG. 5 illustrates a multistage path map in retrieving data from disks. Let G(V,E) represent the paths where V represents the nodes and E represents the connections of the stages. In this function, nodes V are divided into N stages (corresponding to the zones of the disk). The nodes in the $j^{th}$ stage may be denoted as $V_j$. Here every node $V_j$ connects to nodes in the $(j-1)^{th}$ and the $(j+1)^{th}$ stages but not to nodes in other stages. Only one entry point (s) and one end point (v) can be found in this map, as shown in FIG. 5.

Based on this model, a penalty in each mode may be found, as follows:

$$B^{(j)}(\alpha) = \sum_{k=1}^{z} n_k b_k - L_j \qquad (13)$$

wherein $\alpha$ represents $(n_0, n_1, \ldots, n_z)$ and $\Sigma n_k = j$, since $\alpha \in V_j$.

Although there are many possible paths which lind s and v and each path has a maximum penalty, the minimal length of the path may be selected to so that the least buffer requirement in retrieving the data may be found.

In finding the shortest path, any applicable method may be used in this invention. In the embodiment of this invention, the dynamic programming solution is adopted. Reference for the dynamic programming solution may be made to E. Horowitz and S. Sahni: "Fundamentals of Computer Algorithms", Chapter 5: Dynamic Programming. This approach may be taken for reference in this invention.

In finding the shortest path using the dynamic programming solution, let $D^{(j)}(\alpha)$ represent the shortest path from s to v. The shortest path $D^{(j)}(\alpha)$ may be found from the following equation:

$$D^{(j+1)}(\alpha) = \frac{\min}{\forall_u \in V_j \langle \alpha, u \rangle \in E} \max(D^{j-1}(u), B_j(v)) \qquad (14)$$

The path so obtained insures the minimum buffer requirement in retrieving the data.

Segmentation of Data Files

The distribution of data on zoned disk as obtained from the above processes may be optimal while the buffer requirement is concerned. Still, the calculations in the CRT approach consume substantially long operation time. A segmentation algorithm is presented to divide the data files into segments with equal size in order to reduce the complexity of the processing. The segmentation of the data file may be as follows (while two segments is the case):

$$\forall_i, N1_i = N_i * \left(\frac{h1_i}{h1_i + h2_i}\right), N2_i = N_1 - N1_i \qquad (15)$$

wherein $N_i$ and i have the same definitions respectively, $h1_I$ represents the block number in the $i^{th}$ zone in a segment with the size of $B_i$.

The operation time may be dramatically reduced after the segmentation.

EMBODIMENTS

Several video files are processed according to the architecture of this invention. Table 1 shows the block size and the block numbers in each zone and the number of the zero blocks, as the data file of movie "Starwar" is stored under the filing architecture of this invention. In this embodiment, the data file consisting of 174,136 frames, assuming that the period of a service round is 10 seconds and that each disk includes 3 zones. Time required to calculate the optimal distribution of the data on the zoned disk may be:

696×269×75×404=5,672,887,260 (blocks).

The buffer memory required in processing this data file is the above number times the space needed to process a block and to temporarily keep the data.

In other embodiments, the buffer requirement and the utilization rates are shown in Table 2. In this table, B/B denotes the ratio of the minimum buffer requirement over the largest disk block and the utilization rate may be determined from equation (1).

Although the above architecture can satisfy the needs of the minimum buffer requirement and the real-time playback, the files contain substantially large number of blocks and consume long operation time. By using the segmentation algorithm the operation time can be dramatically reduced, as shown in Table 3. This table shows the relation between the number of segmentation and the operation time.

As shown in this table, if a file is divided into 8 segments, the operation time will be reduced from 676 seconds to 6 seconds. When the file is divided into 16 segments, the buffer requirement will dramatically increase, without improvements in the operation time.

As the present invention has been shown and described with reference to preferred embodiments thereof, those skilled in the art will recognize that the above and other changes may be made therein without departing from the spirit and scope of the invention.

TABLE 1

|  | Zone 1 | Zone 2 | Zone 3 | 0 Blocks |
|---|---|---|---|---|
| Block Size | 363,619 | 252,509 | 227,261 | 0 |
| Block No. | 695 | 268 | 74 | 403 |

TABLE 2

| File Name | Deviation | Buffer Requirement | B/B | Utilization Rate | File Format |
|---|---|---|---|---|---|
| I Will | 0.022 | 329,127 | 2.10 | 100% | MTV MPEG-1 |
| Magic ESP | 0.023 | 327,200 | 2.094 | 100% | MTV MPEG-1 |
| Starwar | 0.28 | 1,777,774 | 2.38 | 72% | MOVIE MPEG-1 |
| Speedy | 0.21 | 12,213,792 | 2.26 | 79% | MOVIE MPEG-1 |

TABLE 3

| No. of Segments | Buffer Requirement | B/B | Elapsed Time (sec.) |
|---|---|---|---|
| 1 | 1,777,774 | 2.38 | 676.71 |
| 2 | 1,777,774 | 2.38 | 88.83 |
| 4 | 1,825,877 | 2.44 | 16.08 |
| 8 | 1,891,642 | 2.53 | 6.37 |
| 16 | 4,115,296 | 5.5 | 6.68 |

What is claimed is:

1. A method for storing variable bit-rate data file on zoned disks, comprising the following steps:
   determining number of zero blocks of said variable bit-rate data file according to a decided utilization rate of said zoned disk;
   determining numbers of data blocks to be stored in the zones of the disk, respectively, and sizes of data to be stored in one block, according to a decided number of service rounds and a decided retrieving time period of a data block; wherein a service round comprises time required for all users to retrieve data from said disk for one time in turn, while more than one users are served;
   determining a retrieving sequence of the data blocks according to a multi-level retrieve path selecting model thus the buffer memory required in retrieving said data blocks is minimum; and
   reorganizing said data file according to said retrieving sequence and store said data blocks on said zoned disk;
   characterized in that a constant retrieving time is given to all said data blocks.

2. The method according to claim 1 wherein said number of zero blocks is decided according to the following equation:

$$\text{utilization} = 1 - \frac{N_0}{N};$$

where N is the number of service rounds and $N_0$ is the number of 0 blocks.

3. The method according to claim 1 wherein said size of data to be stored in a zone is proportional to capacity of said zone, as follows:

$$L_i = L \times \frac{C_i}{\sum C_j};$$

wherein L is the size of said data file, $L_i$ is the size of data allocated to the $i^{th}$ zone and $C_i$ is the capacity of said $i^{th}$ zone.

4. The method according to claim 1 wherein said multi-level retrieve path selecting model comprises a retrieving sequence $\{Z_i\}$, $1 \leq i \leq N$, $0 \leq Z_i \leq K$, K is number of zones on said disk, N is the number of blocks of said data file; when $Z_i=0$, no data is retrieved and when $Z_i=g$, the $g^{th}$ zone is retrieved a block.

5. The method according to claim 4 wherein said sequence is so selected thus the length of said retrieve path is minimum.

6. The method according to claim 5 wherein dynamic programming solution is used to determine said retrieve path.

7. The method according to claim 6 wherein the retrieve path $D^{(j)}(\alpha)$ from an entry point s to and ending point v can be determined according to the following equation:

$$D^{(j+1)}(\alpha) = \frac{\min}{\forall_u \in V_j \langle \alpha, u \rangle \in E} \max(D^{j-1}(u), B_j(v))$$

wherein v represents nodes of said path, $V_j$ represents nodes in the $j^{th}$ level, E represents connections between levels and $\alpha$ represents possible nodes at one level.

8. The method according to claim 1 further comprising a process to divide said data file into segments in equal size.

9. The method according to claim 1 wherein said data file is divided into 2 segments and the segmentation is divided according to the following equation:

$$\forall_i, N1_i = N_i * \left(\frac{h1_i}{h1_i + h2_i}\right), N2_i = N_1 - N1_i;$$

wherein $h1_i$ represents the block number in the $i^{th}$ zone in the first segment and $N1_i$ represents size of the first segment and so on.

* * * * *